(12) United States Patent
Kornegay (10) Patent No.: US 9,930,828 B1
(45) Date of Patent: Apr. 3, 2018

(54) SELF-CLEANING RAKE

(71) Applicant: Debra Kornegay, Eatonton, GA (US)

(72) Inventor: Debra Kornegay, Eatonton, GA (US)

(*) Notice: Subject to any disclaimer, the term of this patent is extended or adjusted under 35 U.S.C. 154(b) by 3 days.

(21) Appl. No.: 15/174,134

(22) Filed: Jun. 6, 2016

Related U.S. Application Data (60) Provisional application No. 62/170,755, filed on Jun. 4, 2015.

(51) Int. Cl.
*A01D 7/00* (2006.01)
*A01D 7/10* (2006.01)
*A01D 7/02* (2006.01)

(52) U.S. Cl.
CPC *A01D 7/10* (2013.01); *A01D 7/02* (2013.01)

(58) Field of Classification Search
CPC ............... A01D 9/06; A01D 7/02; A01D 7/10
USPC ......................................... 56/400.01–400.21
See application file for complete search history.

(56) References Cited

U.S. PATENT DOCUMENTS

| | | | | |
|---|---|---|---|---|
| 979,340 | A * | 12/1910 | Ross | A01D 7/10 56/400.08 |
| 1,131,553 | A * | 3/1915 | Rethorn | A01D 7/10 56/400.1 |
| 1,155,897 | A * | 10/1915 | Douglass | A01D 7/10 56/400.08 |
| 1,879,112 | A * | 9/1932 | Cress, Jr. | A01D 7/10 56/400.1 |
| 2,126,105 | A * | 8/1938 | Goheen | A01D 7/10 56/400.1 |
| 2,136,849 | A * | 11/1938 | Hembree | A01D 7/10 294/50.9 |
| 2,552,467 | A * | 5/1951 | Thomas | E01H 1/12 294/61 |
| 3,130,533 | A | 4/1964 | Huegel et al. | |
| 3,258,903 | A | 7/1966 | Rienacker et al. | |
| 3,633,958 | A * | 1/1972 | Mesrobian | A01D 51/00 294/50 |
| 3,750,379 | A | 8/1973 | Huspen | |
| 3,844,023 | A * | 10/1974 | Surribas | E04G 21/121 254/29 A |
| 4,776,158 | A | 10/1988 | Baum | |
| 4,850,185 | A | 7/1989 | Dimon | |
| 5,305,591 | A * | 4/1994 | Gibson, Jr. | A01D 7/10 56/400.08 |
| 5,501,069 | A | 3/1996 | Lentz | |
| 5,713,193 | A | 2/1998 | Stapley et al. | |
| 6,634,163 | B2 * | 10/2003 | Kill | A01D 51/00 56/400.03 |
| 6,851,254 | B1 | 2/2005 | Dalfors | |
| 2002/0134066 | A1 * | 9/2002 | DeWinter | A01D 7/10 56/400.05 |

(Continued)

*Primary Examiner* — Thomas B Will
*Assistant Examiner* — Mai T Nguyen
(74) *Attorney, Agent, or Firm* — Aaron R. Cramer; Cramer Patent & Design, PLLC (57) ABSTRACT

A rake includes a first unit of a plurality of tines and a second unit of a plurality of overlaying rod arms. For each rake tine there is a corresponding overlaying tine. At the end of each overlaying rod arm is a ring the opening through which each corresponding rake tine runs through. The overlaying tines are secured to a sliding member which itself is slidably engages a pole. Lateral movement of the sliding member effects a corresponding lateral movement of the overlaying rod arms along the length of each tine.

20 Claims, 6 Drawing Sheets

(56) References Cited

U.S. PATENT DOCUMENTS

2005/0188670 A1\* 9/2005 Dalfors .................... A01D 7/10
56/400.08

\* cited by examiner

SELF-CLEANING RAKE

RELATED APPLICATIONS

The present invention is a continuation-in-part of, was first described in, and claims the benefit of U.S. Provisional Application No. 62/170,755, filed Jun. 4, 2015, the entire disclosures of which are incorporated herein by reference.

FIELD OF THE INVENTION

The present invention relates generally to the field of rakes and more specifically relates to a rake with a mechanical tine cleaning component for convenient removal of debris.

BACKGROUND OF THE INVENTION

The raking of debris such as leaves, grass, and sticks often leads to material becoming lodged or wedged in-between the tines of the rake. Rakes may be used to move undesirable objects for example leaves on a surface from an area into a pile. The tines project outward from the rake and are conventionally flexible and evenly spaced. On the other hand, debris is inconsistently shaped which may tend to clog the tines; this is not desirable. The general design of a rake has relatively changed very little since it was first introduced. A conventional rakes design is purposefully engineered to provide a user with a means to move debris in an efficient manner.

The flexible tines and pointed ends of lawn rake tines presents unpredictable and unique issues when moving debris. These issues are compounded by conventional radial tine placement, or fan-like shape, and the vertically bent section at the distal end of each tine to increase efficiency of leaf gathering. This leads to jamming of debris between the various components. A means of more efficiently moving debris into a pile and repeating the process without restriction from debris becoming entangled in the tines is needed.

Various attempts have been made to solve problems found in rake tool art. Among these are found in: U.S. Pat. No. 4,776,158 to Wendell E. Baum, U.S. Pat. No. 3,884,023 to Melvin P. Robinson, U.S. Pat. No. 5,305,591 to Herbert M. Gibson, Jr., and U.S. Pat. No. 4,850,185 to James A. Dimon. These prior art references are representative of self-cleaning rakes with tines.

None of the above inventions and patents, taken either singly or in combination, is seen to describe the invention as claimed. Thus, a need exists for a reliable self-cleaning rake, and to avoid the above-mentioned problems.

SUMMARY OF THE INVENTION

It is therefore an object of the present invention to provide such a rake that is capable of cleaning the tines either during or after a debris gathering event, such as yard waste raking and such.

In at least one (1) embodiment of the invention, the rake has a pole with a first end and a second end. Some embodiments have a handle affixes to the pole first end. The second end of the pole has a headpiece attached to it. A plurality of tines each radiate outwardly from the head piece opposite the pole. A sliding mechanism slidingly engages a portion of the pole between the first end and the second end, controlling a plurality of rod arms, each of which engages an individual tine.

Another object of the present invention is to provide such a sliding mechanism having a sliding member with a ring that encompasses a diameter of the pole and enables the sliding mechanism to slide along a length thereof. A sliding member rod connector is attached to a second side of the sliding member. Each of the plurality of rod arms are each attached to the sliding member rod connector.

Another object of the present invention is to provide a spring that is attached to facing surfaces of each of the head piece and sliding member rod connector which biases the sliding mechanism towards the pole first end.

Another object of the present invention is to provide a plurality if first stops, each attached to an individual tine adjacent the second end thereof. A first stop spans the distance between and attached to each of the plurality of tines adjacent to each tine first end. Each rod arm is attached to the individual tine between the first and second stops, which limits travel of the rod arm past them. In a preferred embodiment, each of the rod arms second ends terminate in a ring with encompasses a diameter of the individual tine. In another embodiment, the second stop, the head piece, and the sliding member rod connector are disposed parallel to each other.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY
10 rake
20 tine
25 rod arm
30 first stop
31 second stop
35 rod ring
40 pole
41 handle
42 head piece
43 sliding member
44 sliding member rod connector
45 sliding member ring
50 spring
51 first spring ring
52 second spring ring

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention is directed to a debris-removing rake 10 for providing a user, such as a landscaper, with an efficient and convenient means to remove debris from tines 20 of a rake 10 without having to directly remove the debris manually.

Referring now to the drawings, there is in FIGS. 1 through 7, various views of a self-cleaning rake 10 in a "ready-for-use" configuration according to an embodiment of the present invention.

As shown, the rake 10 may comprise a head piece 42, a debris removal mechanism, and a pole 40 with a handle 41 (for ease of carrying between location and leverage to move debris). The head piece 42 is generally an elongated rectangular member, having a central location on a first side affixed to the distal end of the pole 40. A plurality of tines 20 are formed into a second side, opposite the first side, of the head piece 42 and extend in a fan-like fashion radially outwardly therefrom. The head piece 42 affixes each tine 20 adjacent to each other in order to allow the tines 20 to act virtually in unison as one (1) member, and further mounts them to the pole 40.

A second stop 31, acting as a coupling for intermediate positions of each tine 20 may be designed to allow the tines 20 to virtually act in unison. The second stop is also generally rectangular and wider than the head piece 42 and disposed parallel therewith. The tines 20 function in order to contact and move debris, particularly regarding yard work. The head piece 42 may be structured and arranged such that it may extend a plurality of the tines 20 with spaces in between at their distal ends designed to manipulate and group a multitude of debris sizes.

The tines 20 may be linear, as shown, or alternatively take an obtuse angled form. The pole 40 may comprise a handle grip member 41, as shown, located towards the proximal end of the pole 40, and alternatively the pole 40 may not comprise a handle grip member 41, as previously mentioned. The handle grip member 41 may be affixed to the pole 40 or alternatively may slidably attach to the pole 40, which may allow a user to reposition the handle grip member 41 as desired by the user.

Located along the pole 40 may be a debris removal mechanism, comprising a sliding member 43 slidingly mounted along the pole 40. The sliding member has an upper surface and a lower surface, as well as a proximal end (disposed closer to the proximal end of the pole 40) and a distal end (disposed closer to the distal end of the pole 40). This sliding member 43 may comprise a triangular shape, having a point located at the proximal end, as is shown in the preferred embodiment, and alternatively another shape. In any of the embodiments, a sliding member ring 45 encompasses the outer diameter of the pole 40 and enables the sliding member 43 to slidably engage the pole 40. The sliding member ring 45 is affixed to, or an integral part of the lower surface of the sliding member 43. In a preferred embodiment, the sliding member ring 45 is located generally at the center of weight of the sliding member 43, sliding member rod connector 44, and first end of the spring 50 (described in more detail below) in order to effect the least amount of friction when a force is applied to the sliding member 43. A first side of the sliding member rod connector 44 is affixed to the distal end of the sliding member and is generally rectangular in shape and preferably disposed in a parallel fashion to the aforementioned head piece 42 and second stop 31 features. A number of rod arms 25 each have a proximal end affixed to a second side of the sliding member rod connector 44 and extend outwardly therefrom and towards the tines 20. As shown, the number of the rod arms 25 may be equal to the number of tines 20. A distal end of each of the rod arms 25 are attached to an individual tine 20.

Attached to the second side of the sliding member rod connector 44 is a first spring ring 51. Attached to the first side of the head piece 42, which faces the second side of the sliding member rod connector 43 is a second spring ring 52. Distal ends of a spring 50 is attached to the first spring ring 51 and second spring ring 52. The spring 50 biases the sliding member 43 towards the proximal end of the pole 40. A linear force applied to the sliding member 43 towards the distal end of the pole 40, and hence the head piece 42, enables each rod arm 25 to travel in unison along the length of their respective tine 20 between the first stop 30 and the second stop 31 features. Release of the linear force enables the spring 50 to relax and bias the sliding member 43 towards the distal end of the pole 40. The first stop 30 limits travel of the rod arms 25 past the distal end of the tines 20 and the second stop 31 limits travel of the rod arms 25 towards the limited clearance spaces of the tines 20 as they radiate away from the head piece 42.

Located at the distal ends of each of the rod arms 25 is a ring 35 that may encompass a local portion of an individual tine 20. Towards the distal end of each tine 20, the first stop 30 may be fixedly attached which may prevent the rod arms 25 from extending beyond the distal ends of the tines 20. In a preferred embodiment, the first stops 30 are perpendicular projections along either diametric side of each tine 20, preferably disposed parallel with the second stop 31, head piece 42, and sliding member rod connector 44 features. Each first stop 30 may be designed of a multitude of different shapes as long as they function to prevent the rings 35 of the rod arms 25 from passing around them when the sliding member 43 is forced in a direction towards the distal end of the pole 40. The second stop 31, which also functions to couple the intermediate positions of each of the tines 20, prevents the rings 35 of the rod arms 25 from passing around them when the sliding member 43 travels in a direction towards the proximal end of the pole 40.

Figure 1:
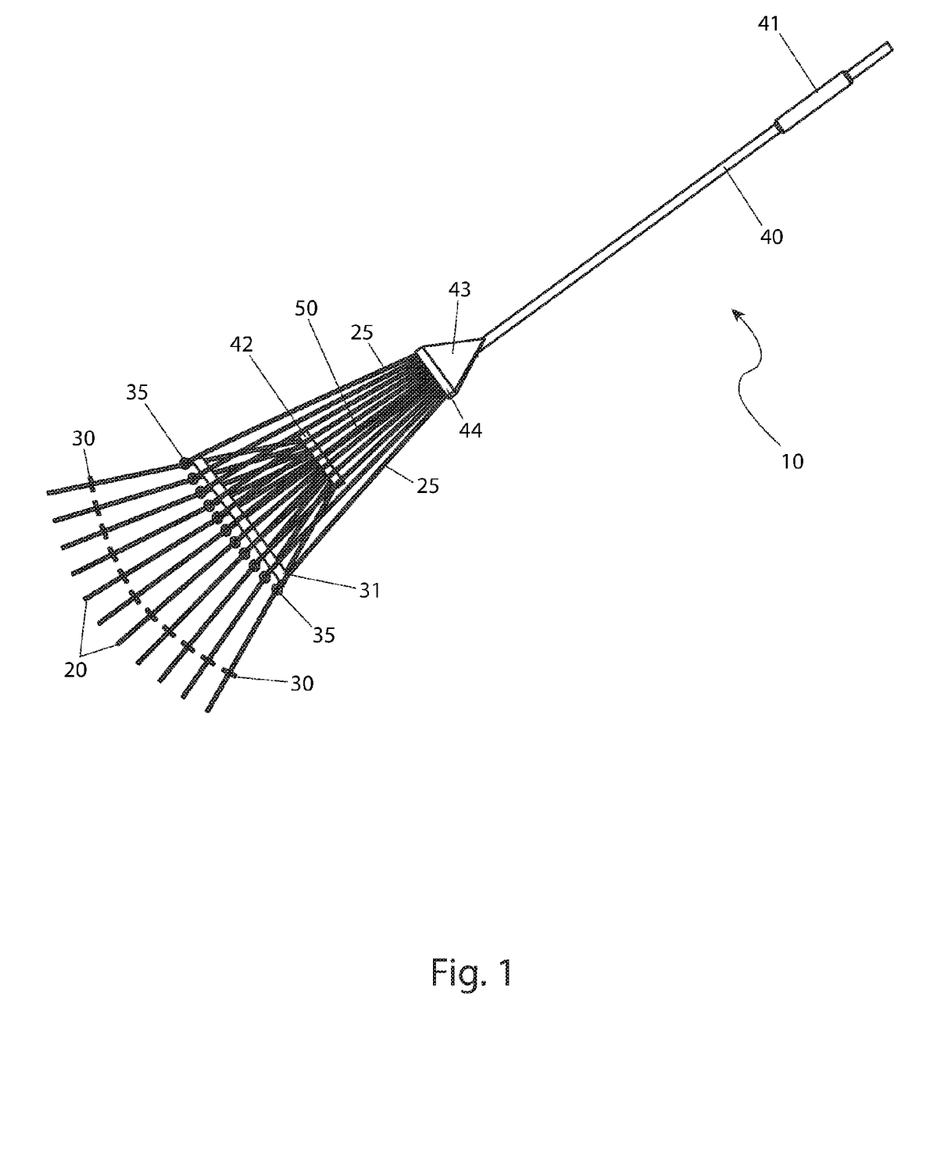
FIG. 1 is a perspective view of a self-cleaning rake 10, according to an embodiment of the present invention.
Figure 2:
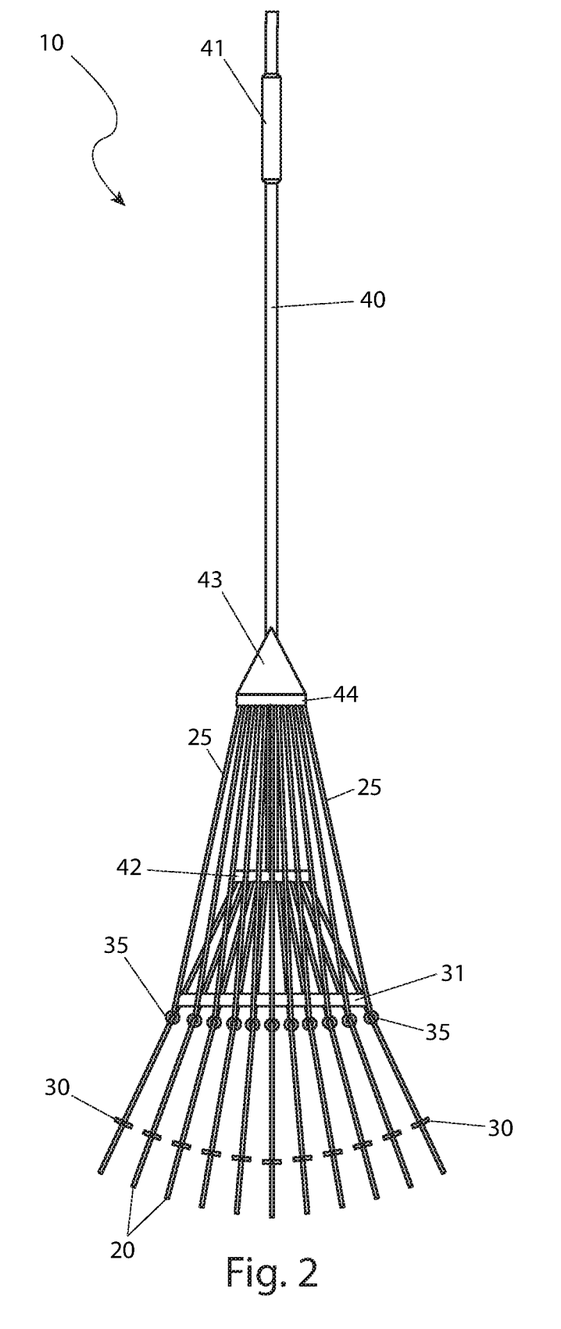
FIG. 2 is a top plan view of the self-cleaning rake 10, according to an embodiment of the present invention.
Figure 3:
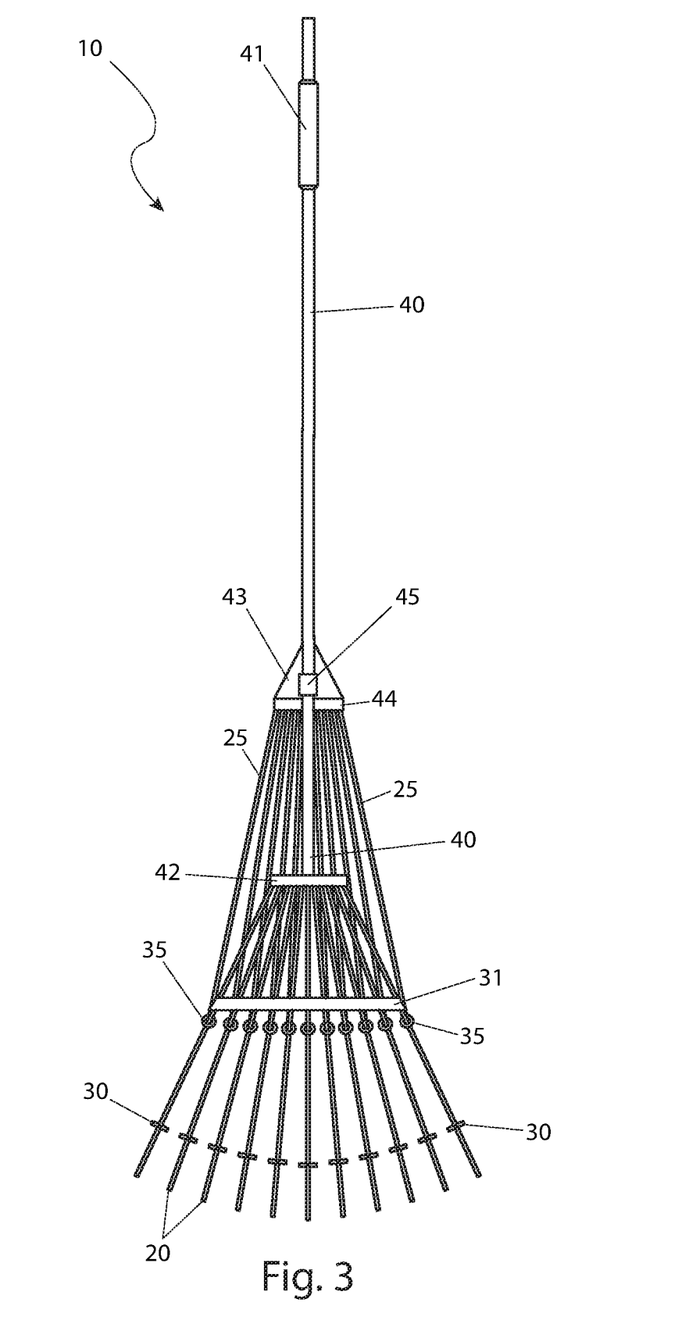
FIG. 3 is a bottom plan view of the self-cleaning rake 10, according to an embodiment of the present invention.
Figure 4:
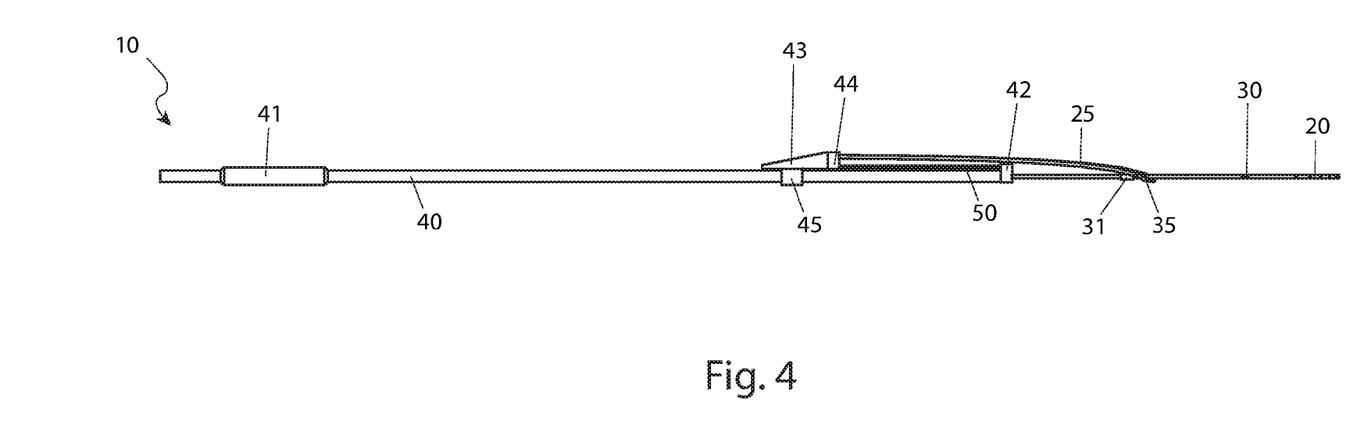
FIG. 4 is a first side elevation view of the self-cleaning rake 10, according to an embodiment of the present invention.
Figure 5:
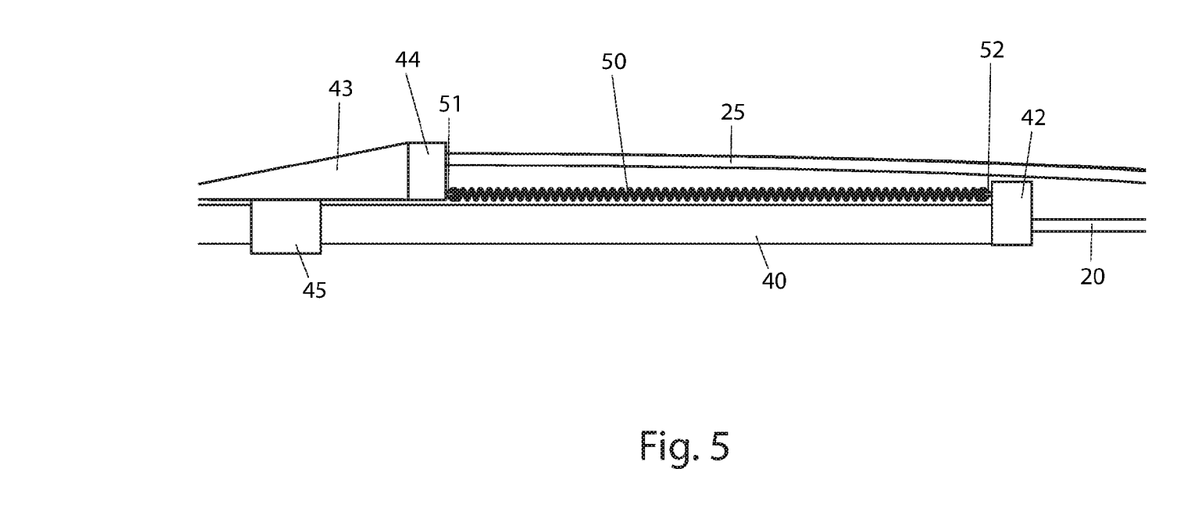
FIG. 5 is a second side elevation view of the self-cleaning rake 10, according to an embodiment of the present invention.
Figure 6:
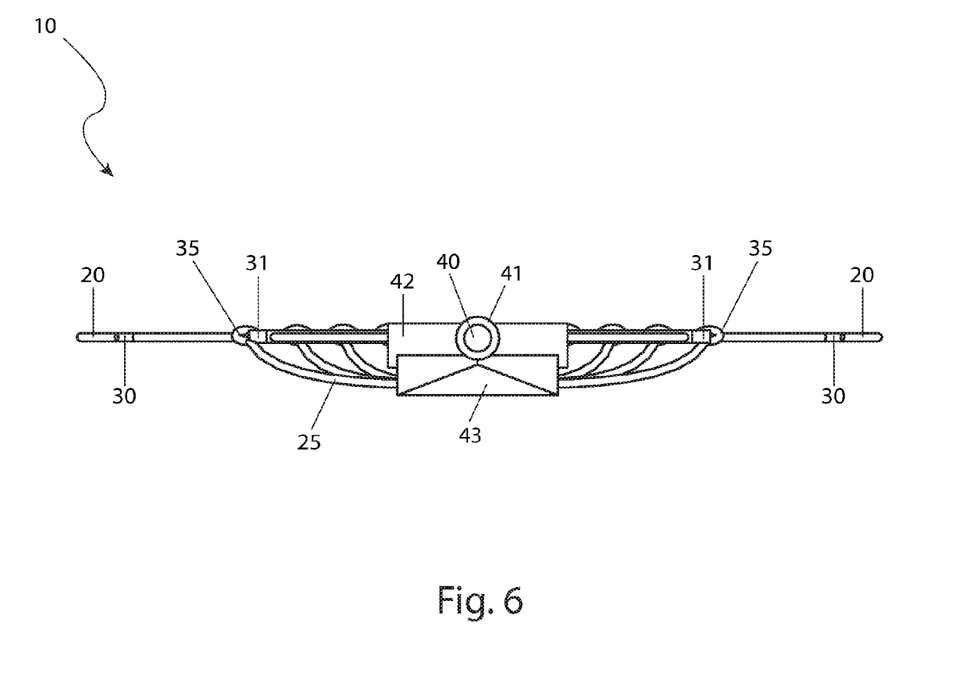
FIG. 6 is a front elevation view of the self-cleaning rake 10, according to an embodiment of the present invention.
Figure 7:
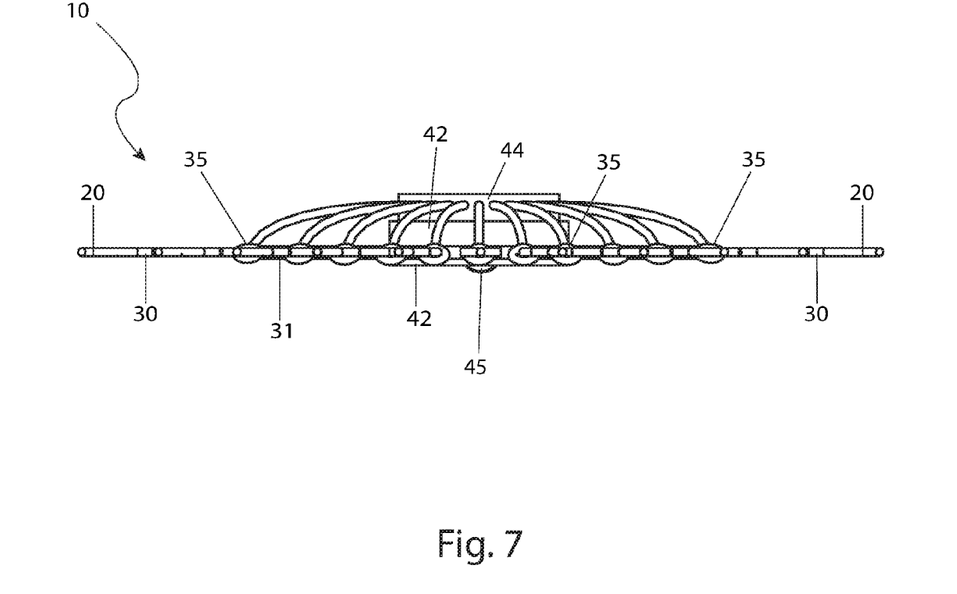
FIG. 7 is a rear elevation view of the self-cleaning rake 10, according to an embodiment of the present invention.
Figure 8:
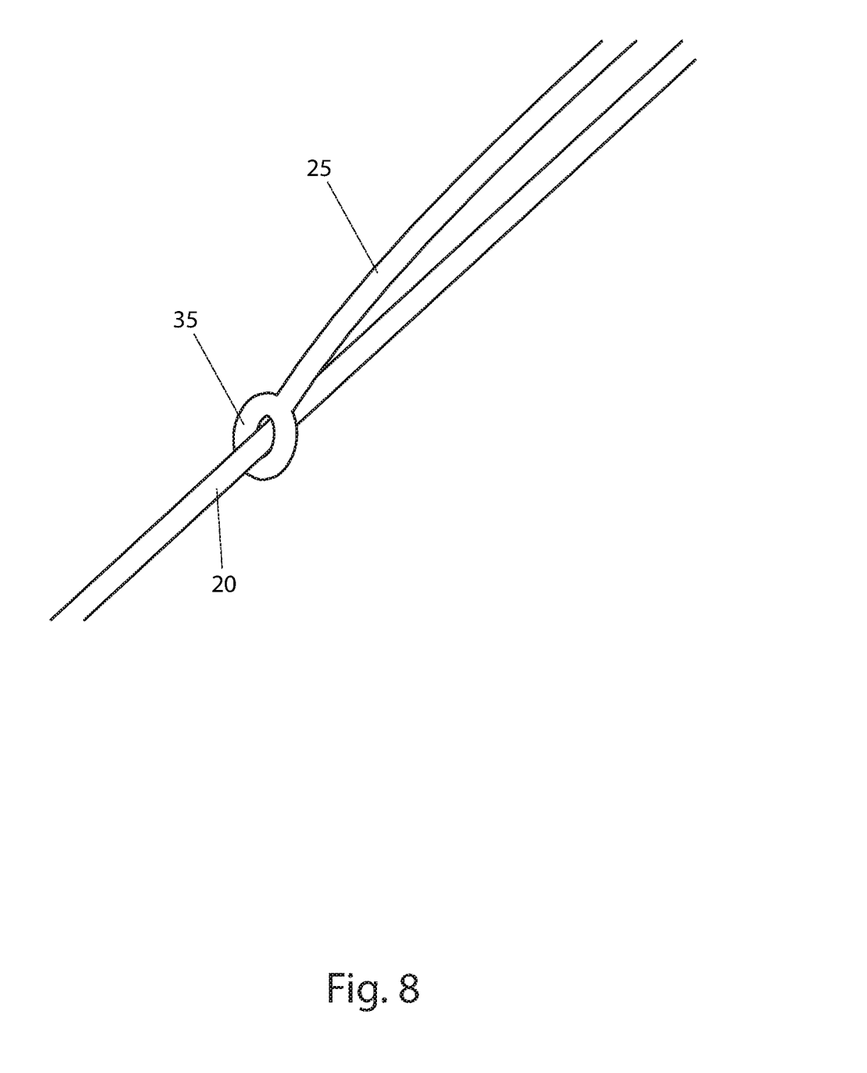
FIG. 8 is a close-up perspective view illustrating the ring 35 connection of a rod arm 25 to a tine 20, according to an embodiment of the present invention.

Referring now to FIG. 8, an expanded perspective view illustrating the ring 35 of an individual rod arm 52 encompassing an individual tine 20 when in use, is herein illustrated according to an embodiment of the present invention.

The sliding member ring 45 of the sliding member 43 may be capable of sliding along the pole 40 with relatively low amounts of friction therebetween. The rod arms 25 may be manufactured of a flexible yet tough material similar to that of the tines 20 that may allow the rod arms 25 to spread open along the tines 20 when in use, and also to travel over the head piece 42 and second stop 31 with minimal frictional force.

It may be noted that a certain amount of clearance may be necessary between the rings 35 and the tines 20, as shown, in order for the rings 35 to properly function when in use. The rings 35 may be virtually circular in design, or alternatively may match any peripheral shape of the tines 20 as to be able to slide distally and proximally along the tines 20 with relatively little friction between the rings 35 and tines 20. The exact specifications, materials used, and method of use of the self-cleaning rake 10 may vary upon manufacturing.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A rake, comprising:
   a pole, having a pole first end and a pole second end;
   a head piece fixed to said pole;
   a plurality of tines, each one of said tines having a tine first end, connected to said head piece, and a tine second end, extending from said head piece;
   a sliding mechanism movably connected to said pole and reciprocally linearly movable along a portion of a longitudinal length of said pole toward and away from said head piece;
   a plurality of rod arms, each one of said rod arms having a rod arm first end connected to said sliding mechanism and a rod arm second end extending from said sliding mechanism and movably connected to an associated one of said tines; and,
   a compression spring connected to said head piece and said sliding mechanism, said spring being configured to bias said sliding mechanism towards said pole first end away from said head piece; and,
   wherein a linear force applied to said sliding mechanism moves said sliding mechanism towards said head piece, such that said rod arms spread radially relative to said sliding mechanism and said rod arm second end of each one of said rod arms slidingly traverses said associated one of said tines to remove material from said tines.

2. The rake of claim 1, wherein said sliding mechanism further comprises:
   a sliding member, having a sliding member first side and a sliding member second side;
   a sliding member ring depending downward from a bottom surface of said sliding member, fully encompassing a diameter of said pole; and,
   a sliding member rod connector, having a sliding member rod connector first end affixed to said sliding member second end;
   wherein each rod arm first end is attached to said sliding member rod connector second end.

3. The rake of claim 1, further comprising:
   a plurality of first stops, each located adjacent to an individual tine second end; and,
   a second stop, affixed to and spanning a distance between each of said plurality of tines adjacent each said tine first end;
   wherein each said rod arm second end is attached to an individual tine between a respective one of said first stop and said second stop;
   wherein each said first stop limits travel of an individual rod arm second end from traversing past an individual tine second end; and,
   wherein said second stop limits travel of an individual rod arm second end from traversing past an individual tine first end.

4. The rake of claim 3, wherein each one of said rod arms comprises a rod ring located at said rod arm second end defining an opening geometrically complementary to a cross-sectional shape of said associated one of said tines and completely surrounding said associated one of said tines.

5. The rake of claim 3, wherein said sliding mechanism further comprises a generally triangular cross-sectional shape.

6. The rake of claim 3, wherein said head piece, said sliding mechanism, and said second stop are oriented parallel to each other.

7. The rake of claim 6, wherein said head piece, said sliding mechanism, and said second stop are each comprises a generally rectangular shape.

8. The rake of claim 3, wherein said plurality of tines radiates outwardly from said head piece.

9. The rake of claim 3, wherein said plurality of rod arms radiates outwardly from said sliding mechanism.

10. The rake of claim 3, wherein each said first stop comprises a pair of protrusions perpendicularly projecting outward from diametrically opposing sides of an individual tine.

11. A rake, comprising:
    a pole, having a pole first end and a pole second end;
    a handle affixed to said pole first end;
    a head piece having a head piece first end, fixed to said pole second end, and a head piece second end;
    a plurality of tines, each one of said tines having a tine first end, connected to said head piece second end, and a tine second end, extending radially from said head piece second end;
    a sliding mechanism movably connected to said pole and reciprocally linearly movable along a portion of a longitudinal length of said pole toward and away from said head piece, said sliding mechanism having a sliding mechanism first end and a sliding mechanism second end;
    a plurality of rod arms, each one of said rod arms having a rod first end, attached to said sliding mechanism second end, and a rod second end, extending from said sliding mechanism second end and movably connected to an associated one of said tines, each one of said rod arms comprising a rod ring located at said rod arm second end and completely surrounding said associated one of said tines and; and,
    a compression spring connected at one end to said head piece first end and connected at the other end to said sliding mechanism second end, said spring being configured to bias said sliding mechanism towards said pole first end and away from said headpiece; and, wherein a linear force applied to said sliding mechanism first end moves said sliding mechanism second end towards said head piece, such that said rod arms spread radially relative to said sliding mechanism and said rod ring of each one of said rod arms slidingly traverses said associated one of said tines to remove material from said tines.

12. The rake of claim 11, wherein said sliding mechanism further comprises:
- a sliding member, having a sliding member first side and a sliding member second side;
- a sliding member ring depending downward from a bottom surface of said sliding member, fully encompassing a diameter of said pole; and,
- a sliding member rod connector, having a sliding member rod connector first end affixed to said sliding member second end;
- wherein each rod arm first end is attached to said sliding member rod connector second end.

13. The rake of claim 12, further comprising:
- a plurality of first stops, each located adjacent to an individual tine second end; and,
- a second stop, affixed to and spanning a distance between each of said plurality of tines adjacent each said tine first end;
- wherein each said rod arm second end is attached to an individual tine between a respective one of said first stop and said second stop;
- wherein each said first stop limits travel of an individual rod arm second end from traversing past an individual tine second end; and,
- wherein said second stop limits travel of an individual rod arm second end from traversing past an individual tine first end.

14. The rake of claim 13, wherein said rod ring of each one of said rod arms defines an opening geometrically complementary to a cross-sectional shape of said associated one of said tines.

15. The rake of claim 13, wherein said sliding mechanism further comprises a generally triangular cross-sectional shape.

16. The rake of claim 13, wherein said head piece, said sliding member, and said second stop are oriented parallel to each other.

17. he rake of claim 16, wherein said head piece, said sliding member, and said second stop are each comprises a generally rectangular shape.

18. The rake of claim 13, wherein each one of said tine first end of said plurality of tines is located next to an adjacent one of said tine first end of said plurality of tines and each one of said tine second end of said plurality of tines radiates outwardly from said head piece and is spaced apart from an adjacent one of said second first end of said plurality of tines.

19. The rake of claim 13, wherein said plurality of rod arms radiates outwardly from said sliding mechanism.

20. The rake of claim 13, wherein each said first stop comprises a pair of protrusions perpendicularly projecting outward from diametrically opposing sides of an individual tine.

* * * * *